US010724666B2

(12) United States Patent
Wada

(10) Patent No.: US 10,724,666 B2
(45) Date of Patent: Jul. 28, 2020

(54) COUPLING MEMBER

(71) Applicant: NITTO KOHKI CO., LTD., Tokyo (JP)

(72) Inventor: Akihiro Wada, Tokyo (JP)

(73) Assignee: NITTO KOHKI CO., LTD., Tokyo (JP)

(*) Notice: Subject to any disclaimer, the term of this patent is extended or adjusted under 35 U.S.C. 154(b) by 0 days.

(21) Appl. No.: 16/199,579

(22) Filed: Nov. 26, 2018

(65) Prior Publication Data
US 2019/0093810 A1 Mar. 28, 2019

Related U.S. Application Data

(63) Continuation of application No. PCT/JP2017/019314, filed on May 24, 2017.

(30) Foreign Application Priority Data

May 24, 2016 (JP) ................................. 2016-103144
Feb. 28, 2017 (JP) ................................. 2017-036818

(51) Int. Cl.
*F16L 37/36* (2006.01)
*F16L 37/12* (2006.01)
(Continued)

(52) U.S. Cl.
CPC ........... *F16L 37/36* (2013.01); *F16L 37/1205* (2013.01); *F16L 37/138* (2013.01); *F16L 37/23* (2013.01)

(58) Field of Classification Search
CPC ......... F16L 37/36; F16L 37/23; F16L 37/138; F16L 37/1205; F16L 37/20; F16L 37/86
(Continued)

(56) References Cited

U.S. PATENT DOCUMENTS 4,135,551 A * 1/1979 Knight et al. ........ F16L 37/127
137/614.06
4,181,150 A * 1/1980 Maldavs ................. F16L 37/23
137/614.06
(Continued)

FOREIGN PATENT DOCUMENTS

JP H07208673 8/1995
JP H1089575 4/1998
(Continued)

OTHER PUBLICATIONS

International Search Report for International Application PCT/JP2017/019314, dated Aug. 1, 2017.

*Primary Examiner* — Kevin L Lee
(74) *Attorney, Agent, or Firm* — Burris Law, PLLC

(57) ABSTRACT

A coupling member inhibits accidental pivoting of a lever for operating a movable member such as a chuck member or a valve. The coupling member has a chuck member mounted displaceably relative to a female coupling body between a temporarily connecting position (first position) and a connecting position (second position). The chuck member is operated by a lever that is pivotable relative to the female coupling body. When the lever is pivoted from a first pivoting position to a second pivoting position, the chuck member is displaced from the temporarily connecting position to the connecting position to connect an associated male coupling member. When the lever is in the second pivoting position, a lock member of the lever engages a lever holding member to inhibit the lever from pivoting toward the first pivoting position.

6 Claims, 10 Drawing Sheets

(51) Int. Cl.
*F16L 37/138* (2006.01)
*F16L 37/23* (2006.01)

(58) Field of Classification Search
USPC .................................. 137/614.03–614.06
See application file for complete search history.

(56) References Cited

U.S. PATENT DOCUMENTS

| | | | | |
|---|---|---|---|---|
| 4,693,268 A | * | 9/1987 | Fahl | ............. F16K 1/12 137/219 |
| 7,942,163 B2 | * | 5/2011 | Sauer | ............. F16L 29/007 137/614.03 |
| 2008/0128034 A1 | | 6/2008 | Fahl | |
| 2012/0299291 A1 | | 11/2012 | Kamiya et al. | |
| 2014/0283939 A1 | | 9/2014 | Blanchard et al. | |

FOREIGN PATENT DOCUMENTS

| | | |
|---|---|---|
| JP | 2003322284 | 11/2003 |
| JP | 2005042857 | 2/2005 |
| JP | 2011169406 | 9/2011 |
| WO | 2003095883 | 11/2003 |

* cited by examiner

COUPLING MEMBER

CROSS-REFERENCE TO RELATED APPLICATIONS

This application is a continuation of International Application No. PCT/JP2017/019314, filed on May 24, 2017, which claims priority to and the benefit of JP 2016-103144 filed on May 24, 2016 and JP 2017-036818 filed Feb. 28, 2017. The disclosures of the above applications are incorporated herein by reference.

FIELD

The present disclosure relates to coupling members, and more particularly, to a coupling member having a lever for operating a movable member attached to the coupling member.

BACKGROUND

The statements in this section merely provide background information related to the present disclosure and may not constitute prior art.

Among coupling members are those having a lever for performing a coupling member connecting operation, a valve opening-closing operation, etc. A pipe coupling shown in Japanese Patent Application Publication No. 2005-42857, for example, has chuck members disposed between two coaxially disposed cylindrical parts. The inner cylindrical part is displaced relative to the outer cylindrical part by pivoting a lever attached to the outer cylindrical part, thereby pivoting the chuck members so as to close the front ends of the chuck members, and thus clamping and holding by the chuck members an externally threaded portion of a pipe to be connected. In a pipe coupling shown in Japanese Patent Application Publication No. H10-89575, a valve disposed in a coupling body is moved longitudinally by pivoting a lever, thereby opening and closing a flow path.

In the above-described pipe couplings having a lever, the lever is held in position by friction between the lever and a pivot shaft thereof or by friction between the lever and another member that is cam-engaged therewith. In this regard, however, the lever may pivot accidentally when the lever is hit against or caught in something, for example, and thus a relatively large force may be applied to the lever. Then, the connected pipe may be disconnected, or the valve may be opened or closed, unintentionally.

SUMMARY

The present disclosure provides a coupling member configured to inhibit accidental pivoting of a lever for operating a movable member such as a chuck member or a valve.

The present disclosure provides a coupling member including the following constituent elements: a cylindrical coupling body having a fluid passage; a movable member mounted displaceably relative to the coupling body between a first position and a second position; a lever pivotable relative to the coupling body between a first pivoting position where the lever places the movable member in the first position and a second pivoting position where the lever places the movable member in the second position; and a lever holding member secured to the coupling body. The lever holding member engages the lever when the lever is in the second pivoting position to inhibit the lever from pivoting toward the first pivoting position.

When the lever is in the second pivoting position, the lever engages the lever holding member to inhibit the lever from pivoting toward the first pivoting position. Therefore, even if force is applied to the lever unintentionally, the lever cannot pivot toward the first pivoting position. Thus, it is possible to inhibit the movable member from returning to the first position from the second position unexpectedly.

In one form, the arrangement may be as follows. The lever has a lever body pivotable relative to the coupling body, and a lock member displaceably attached to the lever body. The lock member is displaceable between a holding position and a releasing position. In the holding position, the lock member engages the lever holding member when the lever is in the second pivoting position to hold the lever in the second pivoting position. In the releasing position, the lock member is displaced away from the lever holding member to disengage from the lever holding member.

In another form, the lever may further have a spring urging the lock member toward the holding position.

In yet another form, the arrangement may be as follows. The direction of displacement of the lock member between the holding position and the releasing position is offset from a radial direction from the pivot center of the lever body, so that force applied to the lever body through the spring when the lock member is displaced from the holding position to the releasing position produces a turning moment which causes the lever to pivot in a direction away from the first pivoting position.

With the above-described structure, the lever is inhibited from being undesirably pivoted toward the first pivoting position by the urging force of the spring when the lock member is displaced from the holding position to the releasing position. Accordingly, even when the lock member is displaced to the releasing position unintentionally, it is possible to inhibit the lever from pivoting toward the first pivoting position immediately.

In one form, the lever holding member may have a sliding engagement surface with which the lock member slidingly engages to hold the lock member in the releasing position when the lever pivots between the first pivoting position and the second pivoting position.

With the above-described structure, the lock member can be placed in the releasing position without specially operating the lock member. Therefore, it is possible to facilitate the operation for pivoting the lever to the second pivoting position.

In another form, the arrangement may be as follows. The coupling member further includes a link member having a first end pivotably connected to the lever at a position away from a pivot center of the lever and a second end pivotably connected to the movable member. The movable member is configured to be displaced in the direction of a longitudinal axis of the coupling body when the lever is pivoted. When the lever is displaced from the first pivoting position to the second pivoting position, a pivot axis of the link member relative to the lever moves from one side to the other side across a plane passing through the pivot center of the lever and a pivot axis of the link member relative to the movable member.

With the above-described structure, when the movable member is subjected to force acting thereon in a direction toward the first position in a state where the lever has been pivoted to the second pivoting position to place the movable member in the second position, the lever is subjected to force that causes the lever to pivot in a direction away from the first pivoting position. Accordingly, even if the movable member is subjected to a large force in a direction toward the first position, the lever cannot be pivoted toward the first pivoting position by the force, and it is possible to inhibit the movable member from returning to the first position.

In yet another form, the movable member may be a chuck member disposed radially outside of the coupling body to lock an associated coupling member. The chuck member is displaceable in the direction of the longitudinal axis of the coupling body between a temporarily connecting position which is the first position and a connecting position which is the second position. The chuck member is also radially displaceable between a locking position where the chuck member locks the associated coupling member and an unlocking position where the chuck member is displaced radially outward from the locking position to unlock the associated coupling member. The chuck member is configured such that, when the lever is pivoted from the first pivoting position to the second pivoting position in a state where the chuck member has locked the associated coupling member in the temporarily connecting position, the chuck member is displaced from the temporarily connecting position to the connecting position to draw the associated coupling member into the fluid passage, thereby connecting the associated coupling member to the coupling member.

Various forms of a coupling member according to the present disclosure will be explained below on the basis of the accompanying drawings. Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1A:
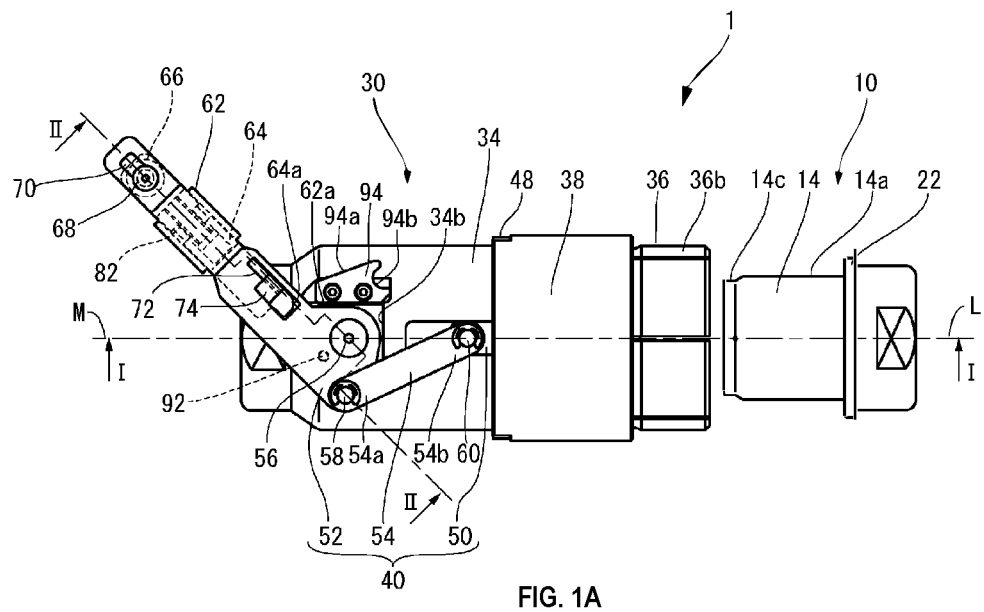
FIG. 1A is a side view of a pipe coupling in an unconnected state according to a first form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIGS. 1A to 5B, a coupling member according to a first form of the present disclosure is includes a female coupling member 30 to which an associated male coupling member 10 is detachably connected. The female coupling member 30 and the male coupling member 10 constitute a pipe coupling 1.

Figure 1B:
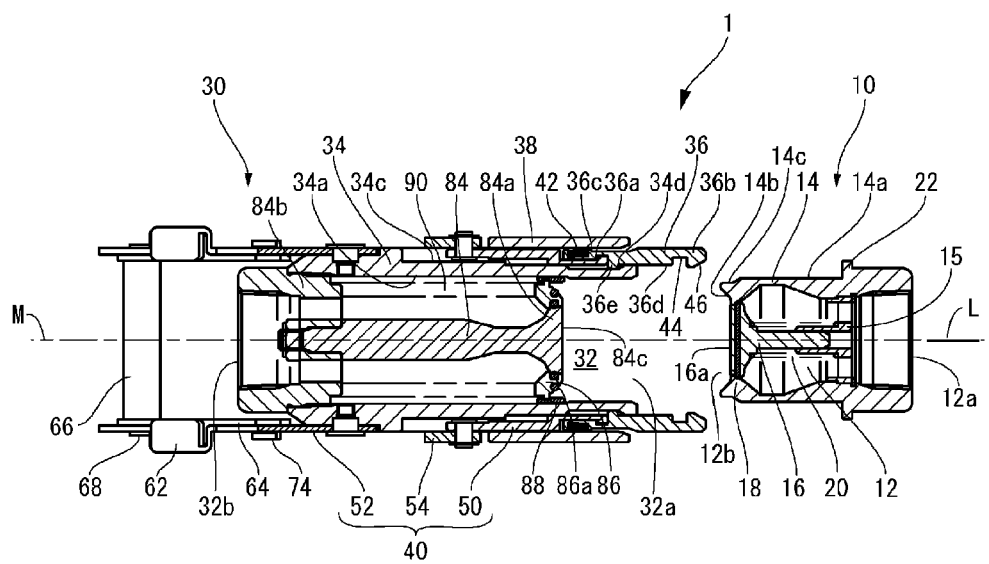
FIG. 1B is a cross-sectional view taken along the line I-I in FIG. 1A.

As shown in FIG. 1B, the male coupling member 10 includes the following constituent elements: a cylindrical male coupling body 14 having a male-side passage 12 extending between a front end opening 12a and a rear end opening 12b; a valve element retaining member 15 secured in the male-side passage 12; a male-side slide valve element 16 retained by the valve element retaining member 15 in the male-side passage 12 displaceably in the direction of a longitudinal axis L of the male-side passage 12; and a spring 20 urging the slide valve element 16 to press against a valve seat portion 18 of the male coupling body 14 to thereby close the male-side passage 12. In addition, the male coupling body 14 has a locking projection (to-be-locked portion) 22 formed on an outer peripheral surface 14a thereof to project radially outward.

As further shown in FIG. 1B, the female coupling member 30 includes the following constituent elements: a cylindrical female coupling body 34 having a female-side passage (fluid passage) 32 extending from a front end opening 32a to a rear end opening 32b; a chuck member (movable member) 36 disposed radially outside of the female coupling body 34 so as to extend forward (rightward as seen in the figure) beyond the front end opening 32a; a cylindrical displacement blocking member 38 attached to the female coupling body 34 so as to cover the chuck member 36 from radially outside; and an operating member 40 for displacing the chuck member 36 in a longitudinal direction.

Figure 2:
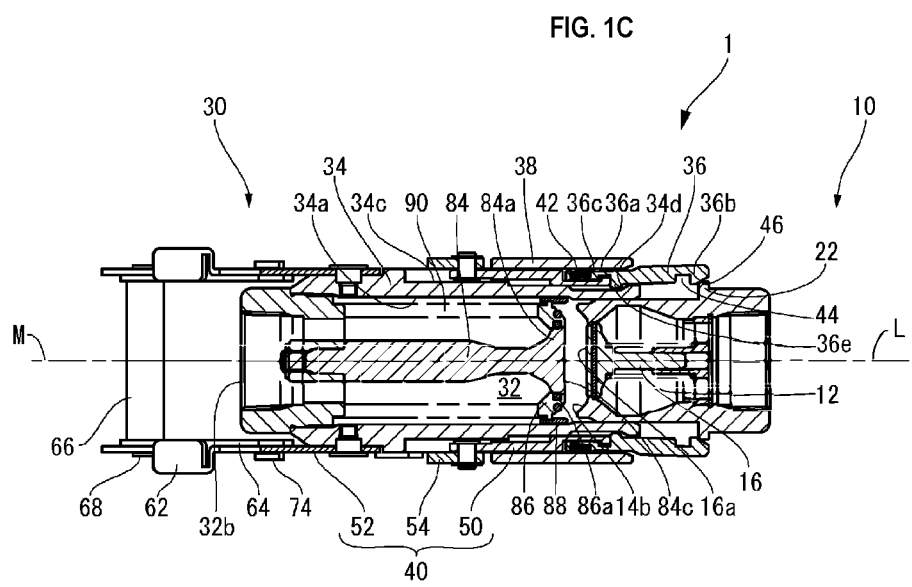
FIG. 2 is a cross-sectional view of the pipe coupling in FIG. 1B, showing a state where a male coupling member is in the middle of being temporarily connected to a female coupling member.

The chuck member 36 has a rear end portion 36a retained by a chuck retaining member 50 of an operating member 40, which is described in greater detail below, and a front end portion 36b extending forward beyond the front end opening 32a of the female coupling body 34. The chuck member 36 has a ring spring 42 disposed on an outer surface 36c of the rear end portion 36a. The ring spring 42 urges the chuck member 36 radially inward. In the state shown in FIG. 1B, the chuck member 36 is held by the ring spring 42 in a position (locking position) where the chuck member 36 extends substantially parallel to a longitudinal axis M. The chuck member 36 has a locking groove 44 formed on an inner surface 36*d* of the front end portion 36*b*. The locking groove 44 is shaped to lock the locking projection 22 of the male coupling member 10. The chuck member 36 further has an inclined surface 46 formed forward of the locking groove 44. The inclined surface 46 is inclined outward toward the forward direction. When a radially outward force acts on the front end portion 36*b* of the chuck member 36, which is held at the rear end portion 36*a* by the ring spring 42, as shown in FIG. 2, the front end portion 36*b* is displaced radially outward to reach a position (unlocking position) where the chuck member 36 is inclined as a whole. The chuck member 36 is also displaceable in the longitudinal direction along the longitudinal axis M by an operating member 40, which is described in greater detail below, i.e. displaceable rearward (rightward as seen in the figure) from a temporarily connecting position (first position) shown in FIG. 1B to a connecting position (second position) shown in FIG. 4B. The chuck member 36 is also displaceable further forward from the temporarily connecting position to a disconnecting position (third position) shown in FIG. 5B.

The displacement blocking member 38, which is disposed outside the chuck member 36, retains the chuck member 36 from radially outside such that, when the chuck member 36 is in the temporarily connecting position (FIGS. 1B, 2 and 3B), the displacement blocking member 38 allows the chuck member 36 to be displaced radially outward from the locking position (FIGS. 1B and 3B) to the unlocking position (FIG. 2), and when the chuck member 36 is displaced rearward to the connecting position (FIG. 4B), the displacement blocking member 38 blocks the chuck member 36 from being displaced from the locking position to the unlocking position. It should be noted that the displacement blocking member 38 is secured to the female coupling body 34 by two screws 48 located at respective positions spaced from each other in the vertical direction as seen in FIG. 1A.

The operating member 40 for operating the chuck member 36 has, as shown in FIGS. 1A and 1B, a chuck retaining member 50 retaining the chuck member 36 in the longitudinal direction, a lever 52 pivotably attached to the female coupling body 34 by a pivot shaft 56 comprising a shoulder screw, and a link member 54 connecting the chuck retaining member 50 and the lever 52. The link member 54 is, as shown in FIG. 1A, pivotably connected at a rear end 54*a* thereof to the lever 52 by a pivot shaft 58 at a position spaced from the pivot shaft 56 of the lever 52 outwardly in the radial direction of the pivot shaft 56, and the link member 54 is pivotably connected at a front end 54*b* thereof to the chuck retaining member 50 by a pivot shaft 60. Pivoting the lever 52 causes the chuck retaining member 50 to be displaced in the longitudinal direction through the link member 54, and the chuck member 36, which is retained by the chuck retaining member 50, is displaced in the longitudinal direction in association with the displacement of the chuck retaining member 50.

Figure 1C:
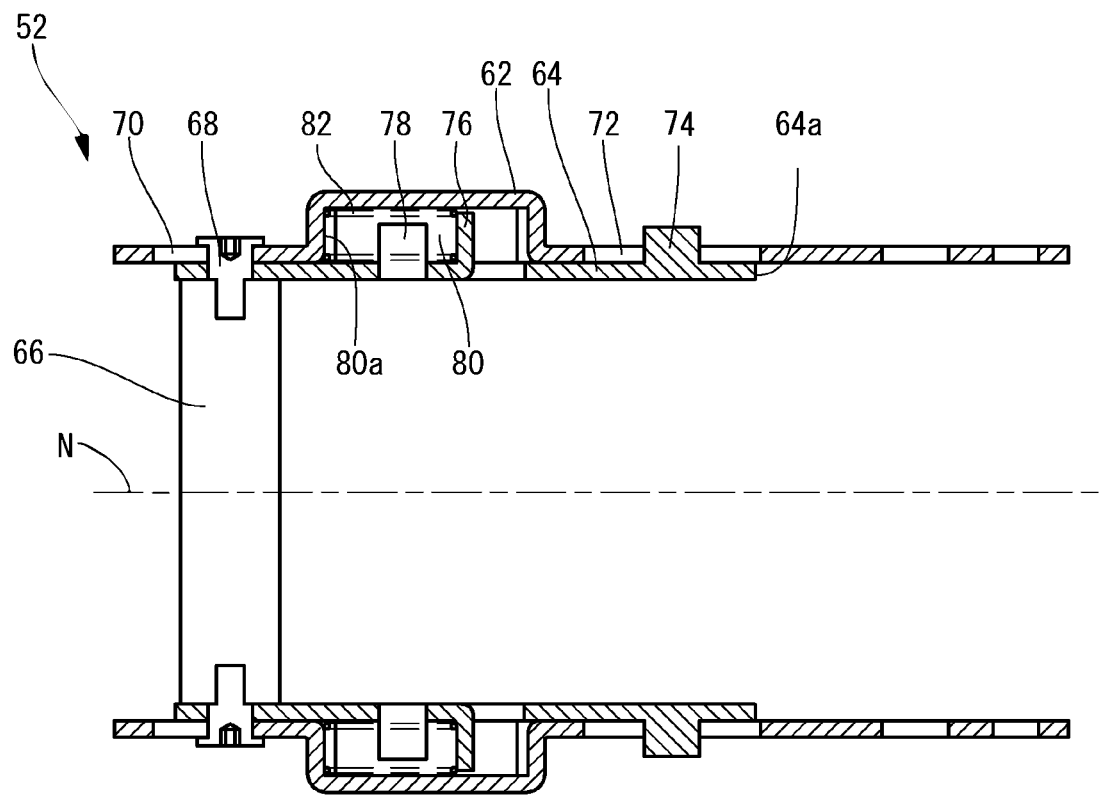
FIG. 1C is a cross-sectional view of a lever taken along the line II-II in FIG. 1A.

The lever 52 has, as shown in FIG. 1C, a pair of lever bodies 62, lock members 64 attached to the lever bodies 62, respectively, and a handle 66 connecting the two lock members 64. The lock members 64 and the handle 66 are secured to each other by shoulder screws 68. The shoulder screws 68 are located in slots 70 in the lever bodies 62, respectively. The lock members 64 have sliding support portions 74 projecting outward through openings 72 in the lever bodies 62, respectively. By the shoulder screws 68 and the sliding support portions 74, the lock members 64 are mounted displaceably in the direction of a longitudinal axis N relative to the lever bodies 62. Each lock member 64 has a spring support portion 76 and a spring guide portion 78, each of which is formed by bending a part of the lock member 64. Each lever body 62 has a recess 80 formed by bending a part thereof. In the recess 80 of each lever body 62, a spring 82 is set between an inner surface 80*a* of the recess 80 and the spring support portion 76 of the associated lock member 64. The spring 82 urges the lock member 64 rightward as seen in FIG. 1C relative to the associated lever body 62. It should be noted that there is one spring guide portion 78 formed at each side of the spring 82 to retain the spring 82 so that the spring 82 cannot be dislodged.

The female coupling member 30 further includes, as shown in FIG. 1B, a valve seat member 84 located in the center of the female-side passage 32, and an annular slide valve element 86 disposed in the female-side passage 32 displaceably in the longitudinal direction along the longitudinal axis M of the female-side passage 32. The slide valve element 86 slides relative to an inner peripheral surface 34*a* of the female coupling body 34 through a sliding member 88 made of a resin. The slide valve element 86 is displaceable between a closed position (FIG. 1B) where the slide valve element 86 sealingly engages a valve seat portion 84*a* of the valve seat member 84 to close the female-side passage 32 between the front end opening 32*a* and the rear end opening 32*b* and an open position (FIG. 4B) where the slide valve element 86 is displaced from the closed position rearward (leftward as seen in the figure) along the longitudinal axis M of the female-side passage 32 to provide communication between the front end opening 32*a* and the rear end opening 32*b*. The slide valve element 86 is connected to a proximal portion 84*b* of the valve seat member 84 through a metallic bellows (urging member) 90 expanding and contracting in the direction of the longitudinal axis M. The bellows 90 urges the slide valve element 86 forward toward the closed position. The bellows 90 is structured not to pass fluid therethrough. Therefore, the fluid passes through the inside of the bellows 90 and does not contact the inner peripheral surface 34*a* of the female coupling body 34.

Figure 3B:
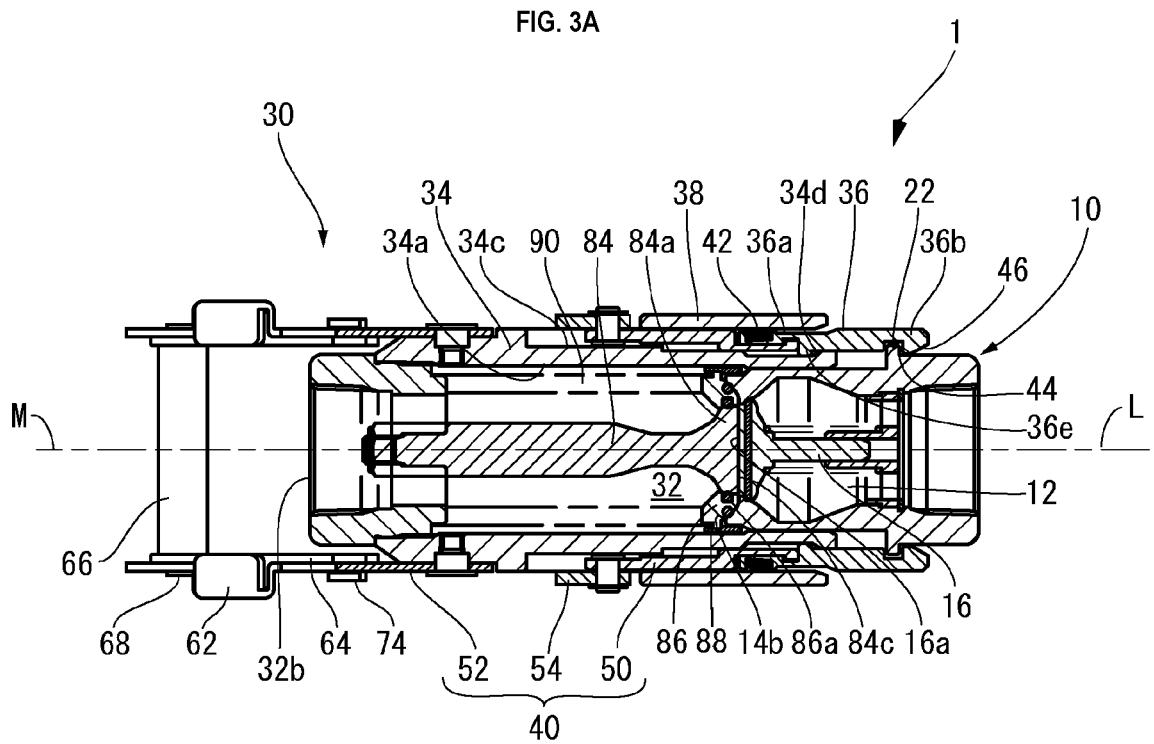
FIG. 3B is a cross-sectional view taken along the line III-III in FIG. 3A.
Figure 4A:
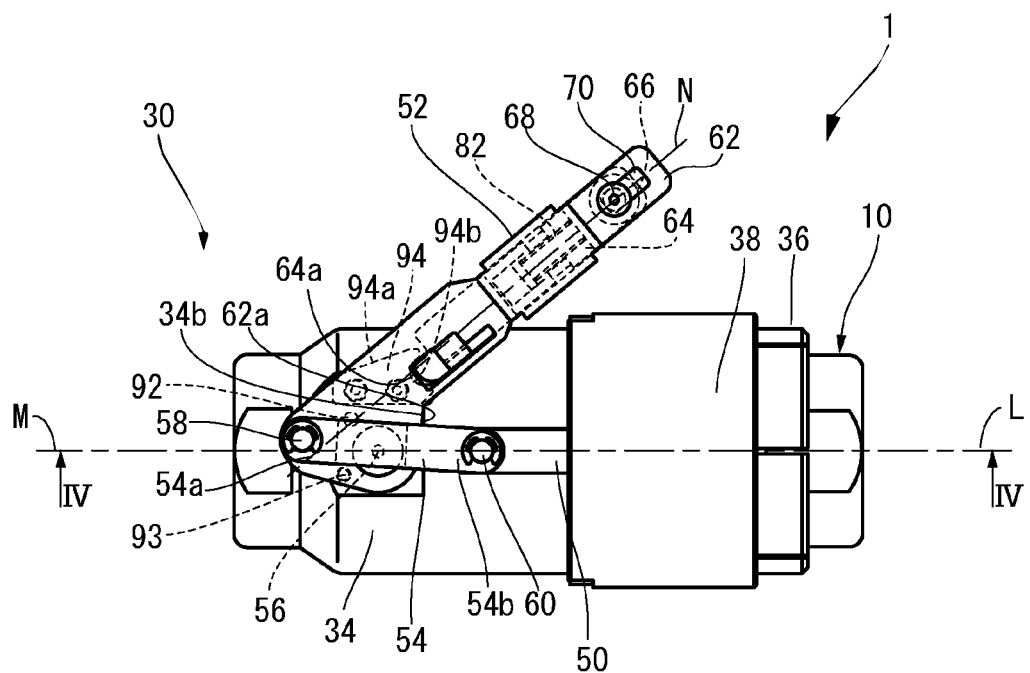
FIG. 4A is a side view of the pipe coupling of FIG. 1A in a connected state, showing a state where a lock member of the lever is in a holding position.
Figure 4B:
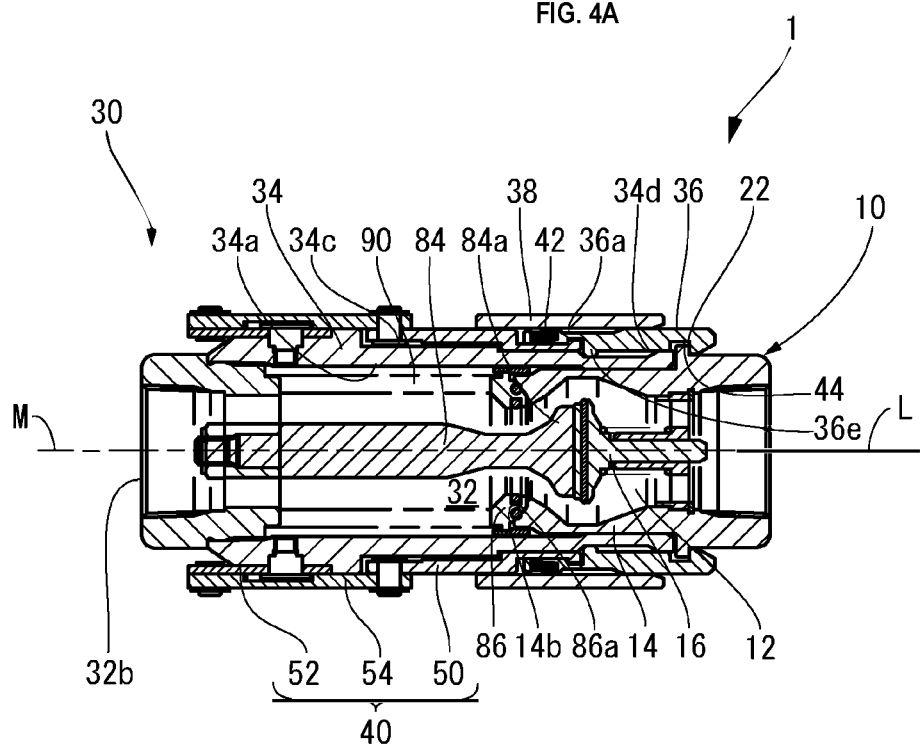
FIG. 4B is a cross-sectional view taken along the line IV-IV in FIG. 4A.

The female-side slide valve element 86 has a front end surface 86*a* formed into an inclined surface gradually reduced in diameter radially inward toward the forward direction. The male coupling body 14 has a rear end surface 14*b* formed into an inclined surface gradually reduced in diameter radially inward toward the forward direction substantially at the same angle as the front end surface 86*a* of the female-side slide valve element 86. When the male coupling member 10 is temporarily connected or finally connected to the female coupling member 30, as shown in FIGS. 3B and 4B, the front end surface 86*a* of the female-side slide valve element 86 and the rear end surface 14*b* of the male coupling body 14 abut against each other with substantially no gap therebetween and thus sealingly engage each other. If there is a cut on the rear end surface 14*b*, which serves as a seal surface, it may be difficult to provide satisfactory sealing between the rear end surface 14*b* and the female-side slide valve element 86. In this regard, however, a recess is formed by the rear end surface 14*b* of the male coupling body 14 and the male-side slide valve element 16, and the rear end surface 14*b* is formed so as to face radially inward in the recess. Therefore, it is unlikely that the rear end surface 14*b* may be damaged by collision with another member. In addition, a smoothly continuous concave surface is formed by the rear end surface 14*b* of the male coupling body 14 and a rear end surface 16*a* of the male-side slide valve element. Thus, a structure having gaps and angular portions eliminated as much as possible is provided, which facilitates washing needed when the internal fluid or the like has adhered thereto.

When the male coupling member 10 and the female coupling member 30 are to be connected together, first, the lever 52 is placed in a first pivoting position shown in FIG. 1A to set the chuck member 36 in a temporarily connecting position. At this time, a ball plunger (not shown) is engaged in a plunger receiving recess 92 of the lever 52 to suppress pivoting of the lever 52. In this state, the male coupling member 10 is inserted into the female-side passage 32 from the front end opening 32*a* of the female coupling body 34. Consequently, as shown in FIG. 2, the locking projection 22 of the male coupling member 10 abuts against the inclined surface 46 of the chuck member 36, causing the chuck member 36 to be displaced radially outward to reach an unlocking position. When the locking projection 22 of the male coupling member 10 reaches the locking groove 44 of the chuck member 36 as a result of the male coupling member 10 being further inserted, as shown in FIG. 3B, the chuck member 36 is displaced radially inward to return to the locking position by the urging force of the ring spring 42. At this time, the locking projection 22 is received in the locking groove 44 to restrict the position of the male coupling member 10 in the longitudinal direction relative to the chuck member 36. Thus, the female coupling member 30 and the male coupling member 10 are temporarily connected to each other. At this time, a surface comprising the rear end surface 14*b* of the male coupling body 14 and the rear end surface 16*a* of the male-side slide valve element 16 and a surface comprising the front end surface 86*a* of the female-side slide valve element 86 and a front end surface 84*c* of the valve seat portion 84*a* abut against each other with no gap therebetween.

Figure 3A:
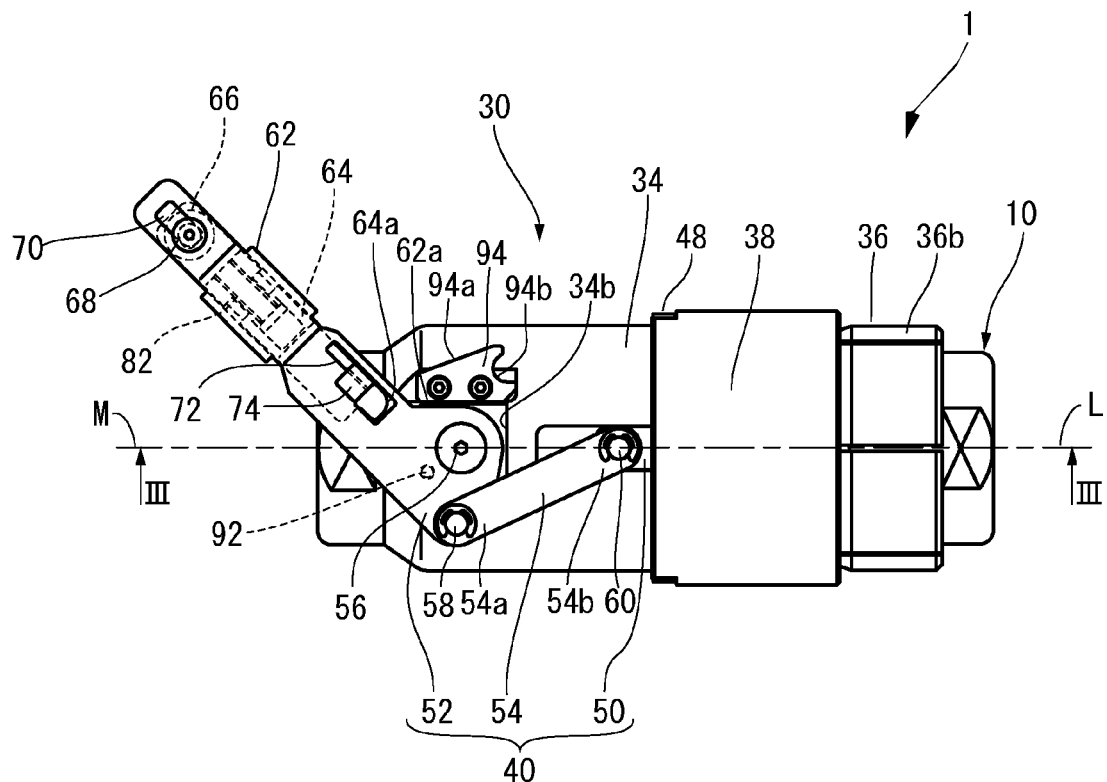
FIG. 3A is a side view of the pipe coupling of FIG. 1A in a temporarily connected state.

When the lever 52 is pivoted from the position shown in FIG. 3A clockwise, the chuck member 36 is displaced rearward to draw the male coupling member 10 into the female-side passage 32. When the lever 52 is pivoted to a second pivoting position shown in FIG. 4A, the chuck member 36 reaches a connecting position shown in FIG. 4B. At this time, the slide valve element 86 of the female coupling member 30 is displaced to an open position by being pressed by the rear end surface 14*b* of the male coupling body 14, and the slide valve element 16 of the male coupling member 10 is displaced to an open position by being pressed by the valve seat member 84 of the female coupling member 30. Consequently, the female-side passage 32 and the male-side passage 12 communicate with each other. Thus, a connected state is established.

In the above-described process of pivoting the lever 52 from the first pivoting position to the second pivoting position to shift the pipe coupling 1 from the temporarily connected state to the connected state, a distal end portion 64*a* of each lock member 64 of the lever 52 slides on an inclined sliding engagement surface 94*a* of a lever holding member 94 secured to the female coupling body 34. Consequently, the lock member 64 is gradually displaced outward in the pivoting direction of the lever 52 against the urging force of the spring 82. When the lever 52 reaches the second pivoting position, as shown in FIG. 4A, the lock member 64 is displaced inward in the pivoting direction by the urging force of the spring 82, and the distal end portion 64*a* is locked in a locking recess 94*b* of the lever holding member 94. When the lock member 64 is in this holding position, the lever 52 cannot be pivoted toward the first pivoting position by the interference of the lock member 64 with the lever holding member 94. Accordingly, the lever 52 is held in the second pivoting position and inhibited from being accidentally pivoted to the first pivoting position, which would otherwise disconnect the male and female coupling members 10 and 30 undesirably. It should be noted that, at this time, a ball plunger (not shown) is engaged in another plunger receiving recess 93 of the lever 52 to suppress pivoting of the lever 52. In addition, the arrangement is such that, if the lever 52 is forced to pivot from the second pivoting position further clockwise as seen in the figure, an abutment surface 62*a* of the lever body 62 abuts against an abutment surface 34*b* of the female coupling body 34, thereby stopping the lever 52 from pivoting any further.

In the process of reaching the connected state from the temporarily connected state, the pivot shaft 58 provided at the rear end 54*a* of the link member 54 relative to the lever 52 moves from the lower side to the upper side as seen in FIG. 4A across a plane (plane extending in the depth direction along the longitudinal axis in the figure) passing through the pivot shaft 56 of the lever 52 relative to the female coupling body 34 and the pivot shaft 60 provided at the front end 54*b* of the link member 54 relative to the chuck retaining member 50. Consequently, in the connected state, when the chuck member 36 receives a forward force as a result of the female coupling member 30 and the male coupling member 10 receiving force that urges the coupling members 30 and 10 to separate from each other, the lever 52 is subjected to a clockwise force as seen in the figure through the link member 54. Accordingly, even when the female coupling member 30 and the male coupling member 10 receive force that urges the coupling members 30 and 10 to separate from each other, the lever 52 does not pivot, and the chuck member 36 cannot be displaced forward to return to the temporarily connected state.

Figure 4C:
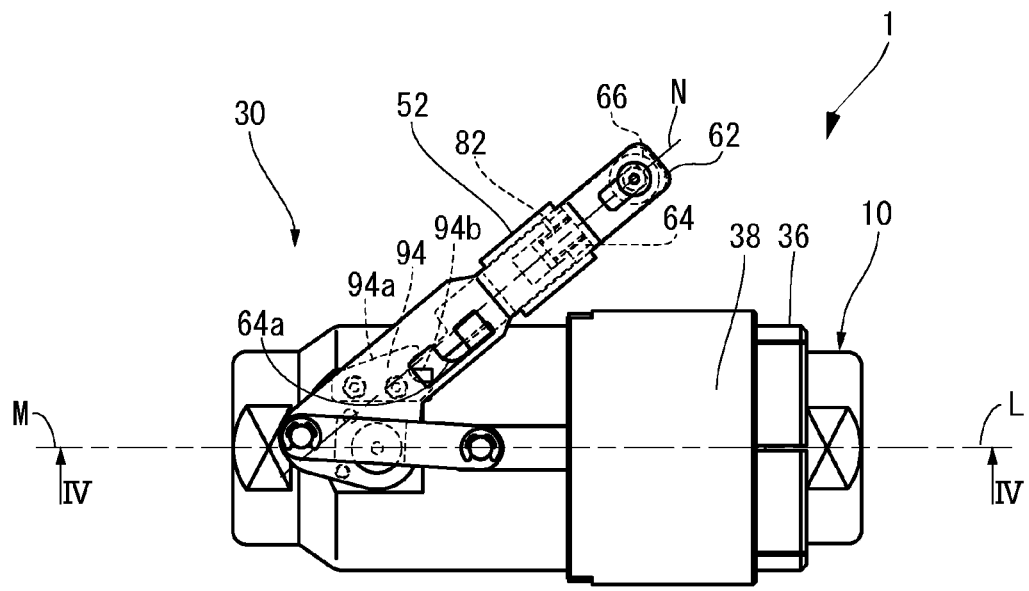
FIG. 4C is a side view of the pipe coupling of FIG. 1A in the connected state, showing a state where the lock member of the lever is in a releasing position.
Figure 5A:
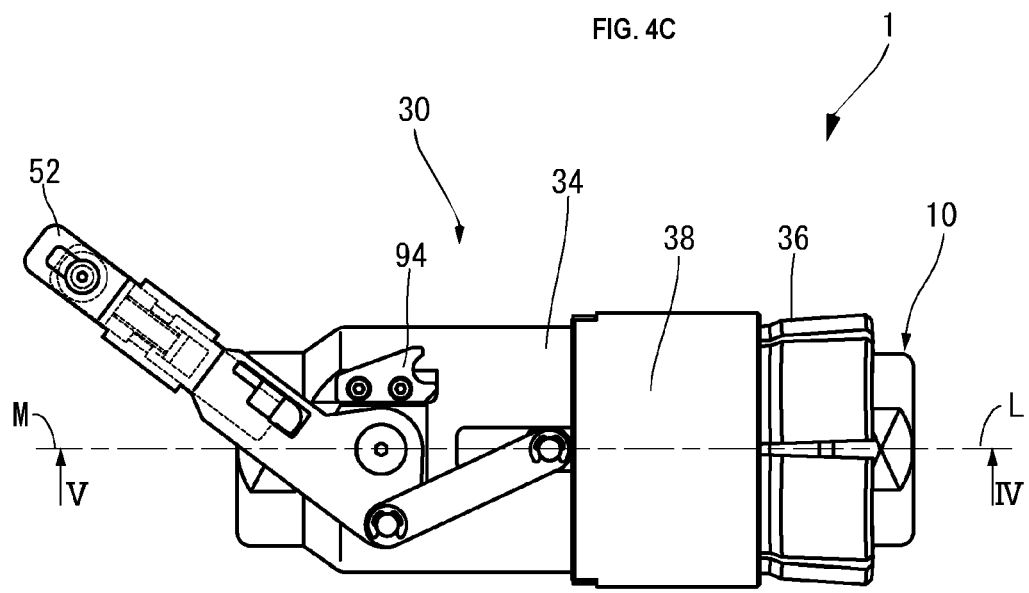
FIG. 5A is a side view of the pipe coupling of FIG. 1A in a disconnected state.
Figure 5B:
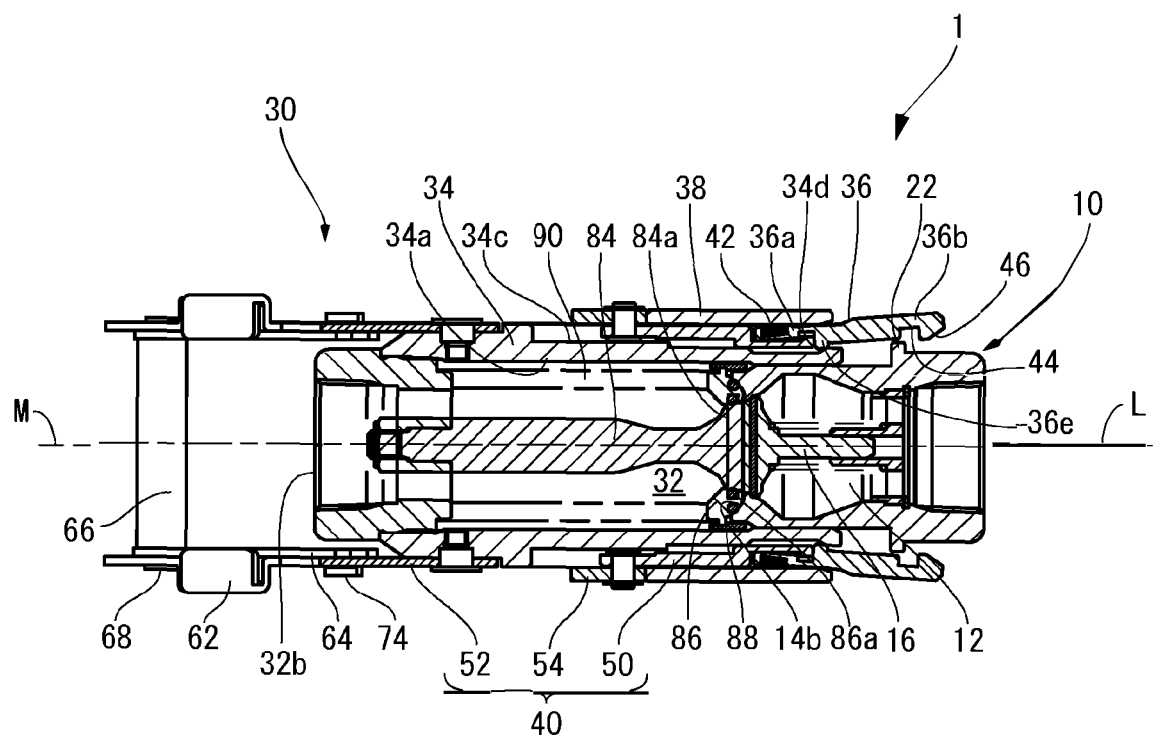
FIG. 5B is a cross-sectional view taken along the line V-V in FIG. 5A.

To disconnect the female coupling member 30 and the male coupling member 10, first, as shown in FIG. 4C, the handle 66, which is secured to the lock member 64 of the lever 52, is pulled outward in the pivoting direction to displace the lock member 64 away from the lever holding member 94 to an unlocking position where the distal end portion 64*a* disengages from the locking recess 94*b*. When the lever 52 is pivoted to the first pivoting position with the lock member 64 held in the unlocking position, the pipe coupling 1 returns to the temporarily connected state shown in FIGS. 3A and 3B. When the lever 52 is further pivoted counterclockwise to a third pivoting position shown in FIG. 5A, the chuck member 36 is further displaced forward. At this time, as shown in FIG. 5B, an inward projection 36*e* of the chuck member 36 rides onto an inclined portion 34*d* of an outer peripheral surface 34*c* of the female coupling body 34. Consequently, the chuck member 36 receives a radially outward force to reach an unlocking position where the front end portion 36*b*, which has the locking groove 44, is displaced radially outward. Thus, the locking projection 22 of the male coupling member 10 and the locking groove 44 are disengaged from each other, resulting in a state where the male coupling member 10 is detachable from the female coupling member 30.

It should be noted that the operating direction of the handle 66 when displacing the lock member 64 from the holding position (FIG. 4A) to the releasing position (FIG. 4C) is offset from the radial direction from the pivot center of the lever 52. That is, the longitudinal axis N of the lock member 64, which coincides with the operating direction of the handle 66, does not pass through the pivot center of the lever 52 but passes through a point rearward of the pivot center. When the handle 66 is operated to displace the lock member 64 from the holding position to the releasing position, the lever body 62 receives an upward force in the direction of the longitudinal axis N through the spring 82, and the force produces a turning moment causing the lever 52 to pivot in a direction away from the first pivoting position (i.e. in a clockwise direction as seen in the figure). Accordingly, when the lock member 64 is displaced from the holding position to the releasing position by operating the handle 66, the handle operating force cannot pivot the lever 52 toward the first pivoting position. With this structure, when the handle 66 is accidentally operated, the lever 52 is inhibited from pivoting at the same time as the operation of the handle 66, which would otherwise unexpectedly disconnect the female coupling member 30 and the male coupling member 10 from each other.

The pipe coupling 1 is configured such that, when the pipe coupling 1 is shifted from the connected state (FIGS. 4A and 4B) to the temporarily connected state (FIGS. 3A and 3B) in the process of disconnecting the female and male coupling members 30 and 10 from each other, both the slide valve element 86 of the female coupling member 30 and the slide valve element 16 of the male coupling member 10 are placed in the respective closed positions in a state where the sealing engagement between the rear end surface 14b of the male coupling member 10 and the slide valve element 86 is maintained. In addition, in the temporarily connected state, no gap is formed between the rear end surface 14b of the male coupling member 10 and the slide valve element 86 of the female coupling member 30 and between the slide valve element 86 of the female coupling member 30 and the slide valve element 16 of the male coupling member 10. With this structure, the internal fluid is inhibited from leaking to the outside when the male coupling member 10 is detached from the female coupling member 30. In actual practice, however, it is impossible to eliminate a gap completely, and the internal fluid may enter such a gap and leak to the outside when the male coupling member 10 is detached from the female coupling member 30. If the leaking fluid is of a high viscosity, the fluid may solidify with the passage of time. If the leaking fluid is a corrosive fluid such as an electrolyte, the coupling member may be corroded. In a conventional coupling member using a locking element, the locking element, which is movable, is disposed near the area of sealing engagement between the coupling members; therefore, the leaking fluid is likely to adhere to the locking element. Further, because the locking element is held in a tapered through-hole, it is difficult to remove the fluid entering the area between the locking element and the through-hole. If the fluid adhering to the locking element is left as it is, the fluid may solidify, or the locking element may be corroded, so that the locking element may fail to operate normally, and it may become impossible to connect and disconnect the coupling members. In contrast to this, the female coupling member 30 has the chuck member 36, which is a movable member, disposed outside the female coupling body 34. Therefore, even if the internal fluid leaks, the possibility of the leaking fluid reaching the chuck member 36 is substantially reduced. Accordingly, the likelihood of the chuck member 36 becoming stuck by the leaking internal fluid is decreased, and thus malfunction is inhibited.

FIGS. 6A to 10 show a pipe coupling 101 according to a second form of the present disclosure. The pipe coupling 101 is made by making various improvements to the pipe coupling 1 according to the above-described first form. In the following, a description of similar structures as those of the pipe coupling 1 according to the first form is omitted, and structures of the pipe coupling 101 that differ from those of the pipe coupling 1 will be explained in detail.

Figure 6A:
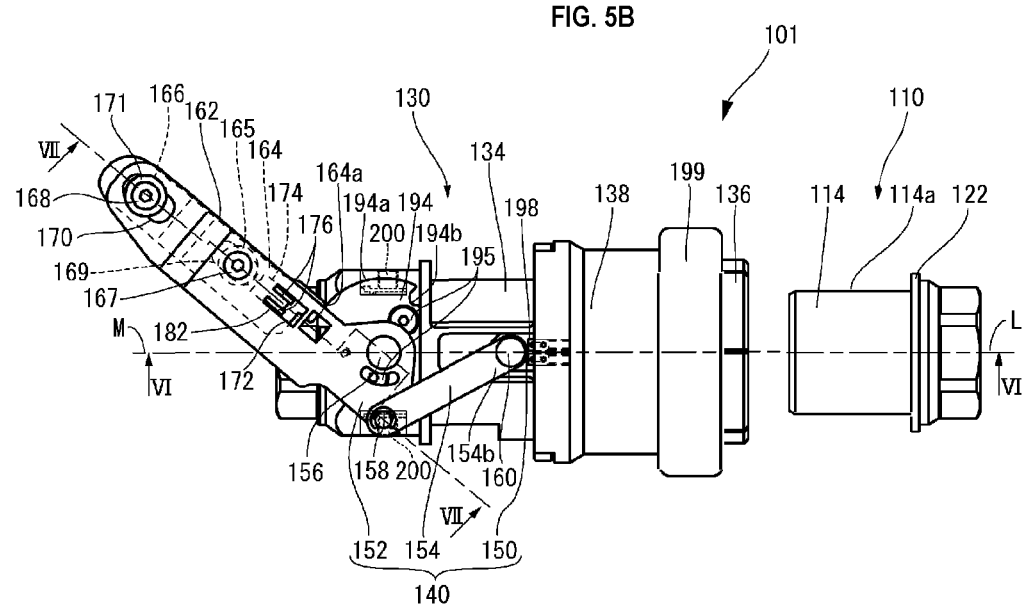
FIG. 6A is a side view of a pipe coupling in an unconnected state according to a second form of the present disclosure.
Figure 6B:
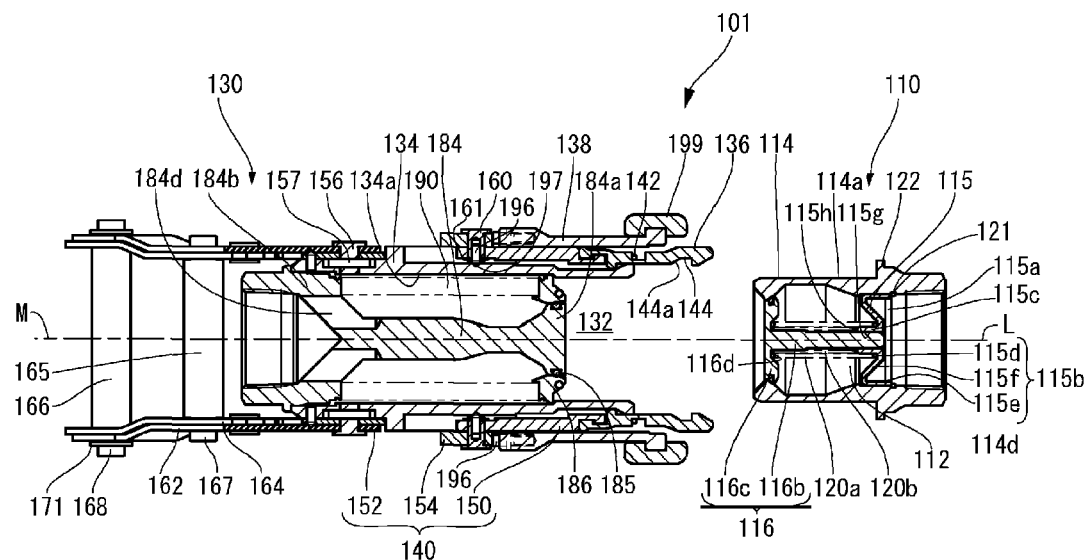
FIG. 6B is a cross-sectional view taken along the line VI-VI in FIG. 6A.

As shown in FIG. 6B, the pipe coupling 101 has a male coupling member 110 including a cylindrical male coupling body 114 having a male-side passage 112, a valve element retaining member 115 secured in the male-side passage 112, a slide valve element 116 retained by the valve element retaining member 115 in the male-side passage 112, and first and second coil springs 120a and 120b urging the slide valve element 116.

Figure 7:
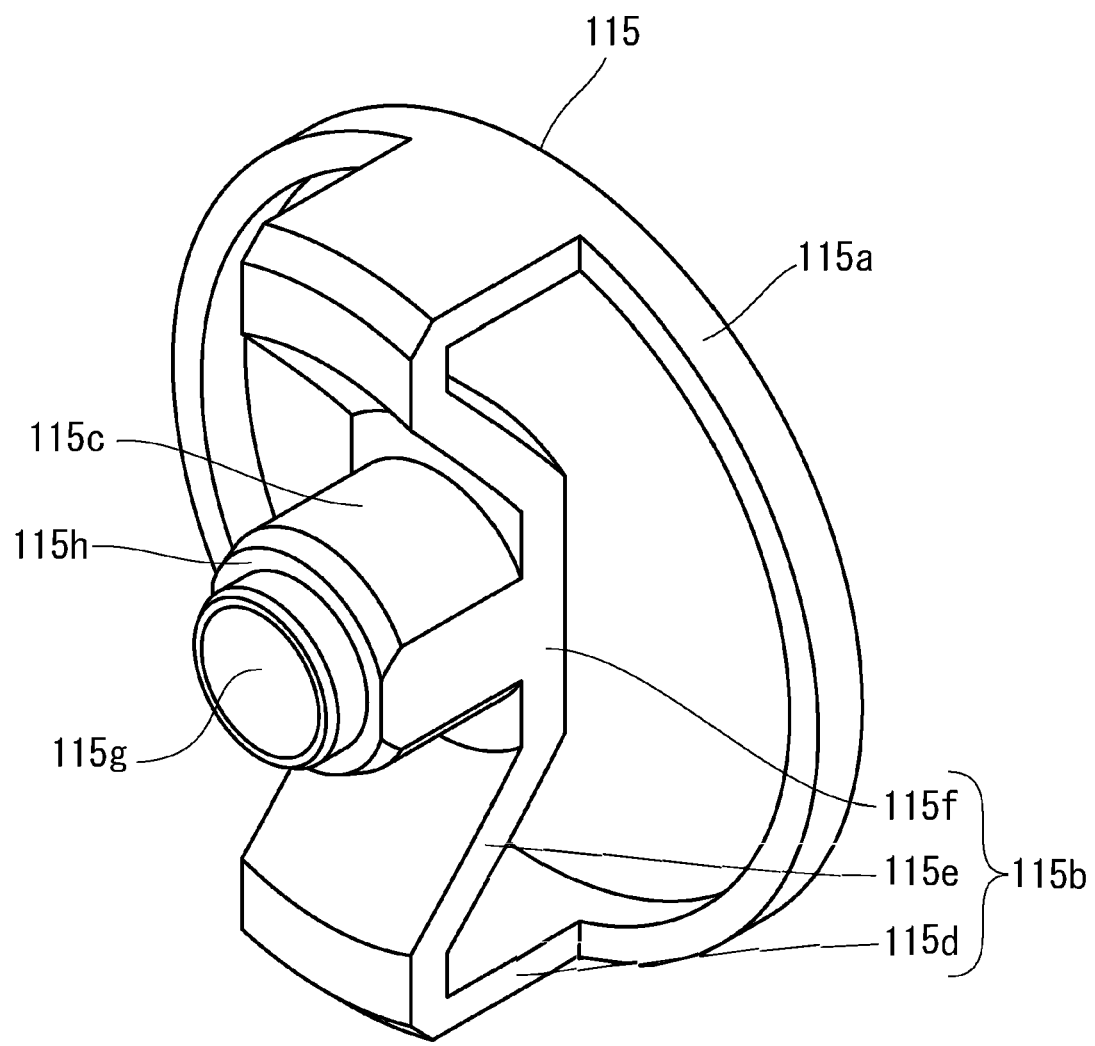
FIG. 7 is a perspective view of a valve element retaining member of a male pipe coupling member in FIG. 6A.
Figure 8:
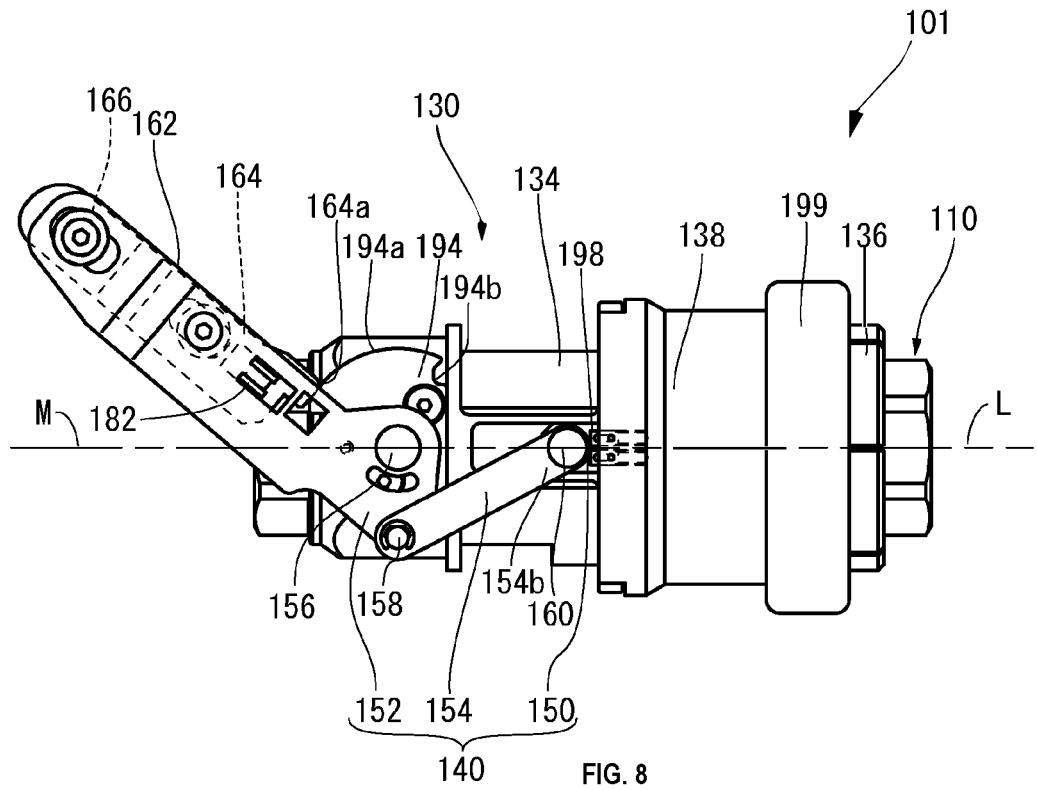
FIG. 8 is a side view of the pipe coupling of FIG. 6A in a temporarily connected state.
Figure 9:
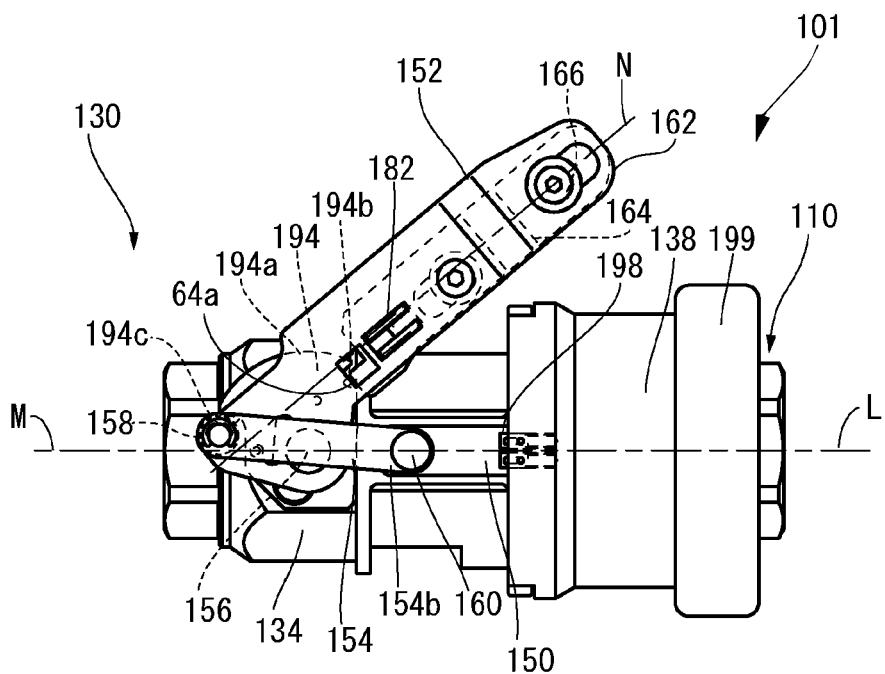
FIG. 9 is a side view of the pipe coupling of FIG. 6A in a connected state.
Figure 10:
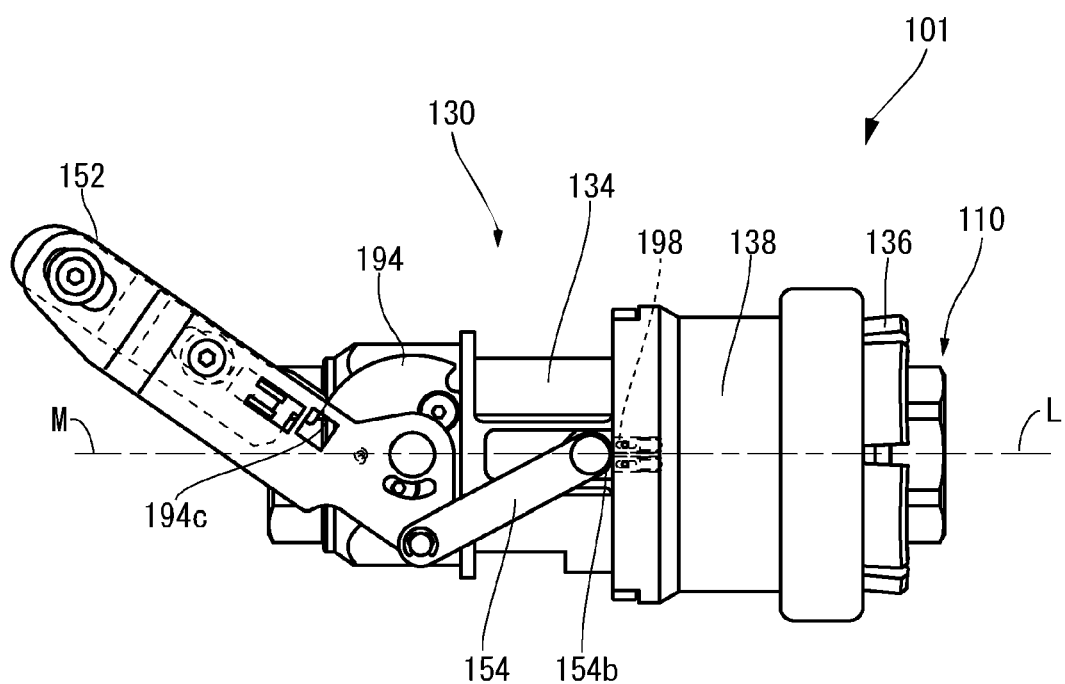
FIG. 10 is a side view of the pipe coupling of FIG. 6A in a disconnected state.

As shown in FIGS. 6B and 7, the valve element retaining member 115 comprises an annular secured portion 115a secured to an inner peripheral surface 114d of the male coupling body 114, a support portion 115b traversing the annular secured portion 115a diametrically, and a spring retaining portion 115c extending from the center of the support portion 115b rearward (leftward as seen in the figures) in the direction of a longitudinal axis L. The support portion 115b comprises first regions 115d extending from the annular secured portion 115a along the inner peripheral surface 114d of the male coupling body 114, second regions 115e extending from the first regions 115d, respectively, obliquely forward toward the radially inward direction, and a third region 115f extending between the two second regions 115e. Thus, the support portion 115b has an M-shaped configuration as a whole. The valve element retaining member 115 is secured to the male coupling body 114 by a stop ring 121. In the secured state, the valve element retaining member 115 has the first regions 115d of the support portion 115b disposed along the inner peripheral surface 114d of the male coupling body 114. Therefore, the valve element retaining member 115 is stably held with respect to the male coupling body 114. Further, the spring retaining portion 115c has a through-hole 115g formed in the center thereof to receive a shaft portion 116b of the male-side slide valve element 116.

The male-side slide valve element 116 comprises, as shown in FIG. 6B, a shaft portion 116b and a disk-shaped lid portion 116c. The lid portion 116c has an annular groove 116d formed at a joint thereof where the lid portion 116c joins with the shaft portion 116b. The first coil spring 120a is disposed between the annular groove 116d of the male-side slide valve element 116 and the second regions 115e of the support portion 115b of the valve element retaining member 115. The second coil spring 120b is smaller in diameter than the first coil spring 120a and coaxially disposed inside the first coil spring 120a between the annular groove 116d of the male-side slide valve element 116 and a step portion 115h of the spring retaining portion 115c of the valve element retaining member 115. It is possible to increase the length of the first coil spring 120a by providing the annular groove 116d in the slide valve element 116 and by forming the support portion 115b of the valve element retaining member 115 into an M shape. Thus, it is possible to sufficiently increase the urging force for the slide valve element 116 while providing the amount of stroke necessary for the slide valve element 116. Further, in addition to the first coil spring 120a, the second coil spring 120b is coaxially disposed therein, thereby further increasing the urging force for the slide valve element 116 so that the slide valve element 116 cannot be displaced easily even if the slide valve element 116 is accidentally pushed from the outside during washing the male coupling member 110, for example. In the male coupling member 10 of the first form, the male coupling body 14 has a step portion 14c (FIG. 1B) formed on the outer peripheral surface 14a at a rear end thereof in order to avoid an interference between the male coupling member 10 and the sliding member 88, which is attached to the female-side slide valve element 86, when the male coupling member 10 is connected to the female coupling member 30. In this regard, the second form need not have a step portion on an outer peripheral surface 114*a* of the male coupling body 114 because the female coupling member 130 is structured to have no sliding member, as will be described in greater detail below. Accordingly, the outer peripheral surface 114*a* presents a less uneven surface. Thus, the internal fluid and other dirt adhering to the outer peripheral surface 114*a* can be removed even more easily.

In the female coupling member 130 of the second form, as shown in FIG. 6B, a chuck member 136 has a locking groove 144 having a rear side surface formed into an inclined surface 144*a* gradually reduced in diameter toward the rearward direction. Therefore, when the chuck member 136 is displaced radially outward to an unlocking position by pivoting a lever 152 from a first pivoting position (FIG. 8) to a third pivoting position (FIG. 10) in a state where the male coupling member 110 is connected to the female coupling member 130, the locking groove 144 of the chuck member 136 is inhibited from catching a locking projection 122 of the male coupling member 110, which would otherwise interfere with the displacement of the chuck member 136. In addition, an even simpler ring spring 142, which is wound approximately only one turn, is used as an urging member for urging the chuck member 136 radially inward. The ring spring 142 is the one usually used as a stop ring to secure a member.

An operating member 140 for operating the chuck member 136 has, as shown in FIGS. 6A and 6B, a chuck retaining member 150 retaining the chuck member 136 in the longitudinal direction, a lever 152 pivotable relative to a female coupling body 134, and a link member 154 connecting the chuck retaining member 150 and the lever 152. Between the lever 152 and the male coupling body 114 is disposed a lever holding member 194 secured to the male coupling body 114 by two screws 195. The lever 152 is attached to the lever holding member 194. Specifically, a pivot shaft 156 is inserted from the outside of the lever 152 so as to extend through the lever 152 and the lever holding member 194, and a pin 157 is fitted to the pivot shaft 156 at a position inside the lever holding member 194 to retain the pivot shaft 156. Thus, the lever 152 is rotatable about the pivot shaft 156 relative to the female coupling body 134 through the lever holding member 194. In the first form, the pivot shaft 56 is a shoulder screw and engaged with the female coupling body 34. In that case, the engagement between the pivot shaft 56 and the female coupling body 34 may be loosened as the lever 52 is pivoted repeatedly, and the pivot shaft 56 may be dislodged. In this regard, the above-described structure in which the pivot shaft 156 is secured by the pin 157 reduces the possibility of dislodgement of the pivot shaft 156.

A pivot shaft 160 pivotably connects a front end 154*b* of the link member 154 and the chuck retaining member 150. As shown in FIG. 6B, the pivot shaft 160 is retained by attaching an E-shaped snap ring 161 to the pivot shaft 160 at a position inside the chuck retaining member 150. By disposing the E-shaped snap ring 161 at a position where the E-shaped snap ring 161 is not exposed to the outside, it is possible to inhibit the E-shaped snap ring 161 from coming off unintentionally by collision with another member, for example, which would otherwise cause the pivot shaft 160 to be dislodged undesirably. In addition, the pivot shaft 160 has a ball plunger 196 embedded therein. When the lever 152 is in the first pivoting position, the ball plunger 196 is engaged in a plunger receiving recess 197, which is formed on the outer peripheral surface of the female coupling body 134, to suppress pivoting of the lever 152 from the first pivoting position.

Figure 6C:
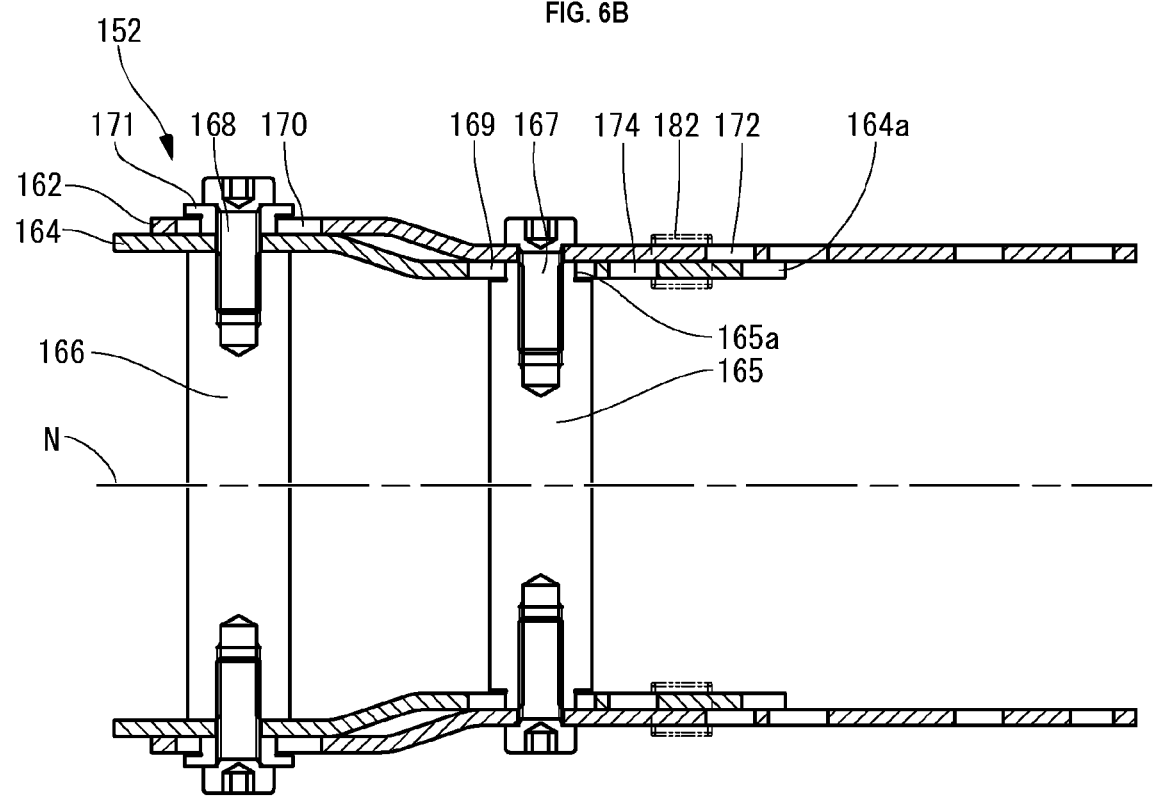
FIG. 6C is a cross-sectional view of a lever taken along the line VII-VII in FIG. 6A.

The lever 152 has, as shown in FIG. 6C, a pair of lever bodies 162, lock members 164 attached to the lever bodies 162, respectively, a connecting shaft 165 connecting the lever bodies 162, and a handle 166 connecting the two lock members 164. The connecting shaft 165 has a stepped configuration having small-diameter portions 165*a* at both ends thereof. The connecting shaft 165 is configured such that, when the connecting shaft 165 is secured to the lever bodies 162 by screws 167, the small-diameter portions 165*a* are located in slots 169 in the lock members 164, respectively. The lock members 164 and the handle 166 are secured to each other by screws 168 with spacers 171 interposed therebetween. The spacers 171 are located in slots 170 in the lever bodies 162, respectively. The small-diameter portions 165*a* of the connecting shaft 165 and the spacers 171 are retained displaceably in the direction of a longitudinal axis N in the slots 169 in the lock members 164 and in the slots 170 in the lever bodies 162, respectively. With this structure, the lock members 164 are displaceable in the direction of the longitudinal axis N, together with the handle 166, relative to the lever bodies 162. As will also be clear from FIG. 6A, each lever body 162 is formed with a first opening 172 comprising portions extending in the direction of the longitudinal axis N and a portion connecting these portions, and each lock member 164 is also formed with a second opening 174 having a configuration similar to that of the first opening 172 but opposite thereto in the direction of the longitudinal axis N. The first opening 172 and the second opening 174 are formed at respective positions where the openings 172 and 174 partly overlap each other, and form two communicating holes 176 at their overlapping portions. Springs 182 are disposed to extend through the communicating holes 176. The springs 182 urge the lock members 164 toward the axis of rotation of the lever 152 (rightward as seen in FIG. 6C) in the direction of the longitudinal axis N relative to the lever bodies 162.

While the lever 152 is pivoting from the first pivoting position (FIG. 8) to the second pivoting position (FIG. 9), a distal end portion 164*a* of each lock member 164 of the lever 152 slides on a sliding engagement surface 194*a* of the lever holding member 194, which is secured to the female coupling body 134. The sliding engagement surface 194*a* is in the shape of a circular arc centered on the pivot shaft 156 of the lever 152. Therefore, the lock member 164 is held in a fixed position relative to the lever body 162 and not displaced until the lever 152 reaches the second pivoting position. When the lever 152 reaches the second pivoting position, the lock member 164 is displaced inward in the pivoting direction by the urging force of the springs 182, and the distal end portion 164*a* of the lock member 164 is locked in a locking recess 194*b* of the lever holding member 194. Thus, the lever 152 is held in the second pivoting position. If the lever 152 is forced to further pivot clockwise as seen in the figure from the second pivoting position, a pivot shaft 158 pivotably connecting the lever 152 and the link member 154 abuts against an abutment surface 194*c* provided on the lever holding member 194, thereby stopping the lever 152 from pivoting any further.

A displacement blocking member 138 blocks displacement of the chuck member 136 to the unlocking position when in the connecting position. The displacement blocking member 138 has a plunger 198 attached thereto. When the lever 152 is further pivoted from the first pivoting position (FIG. 8) counterclockwise to the third pivoting position (FIG. 10), the plunger 198 is pushed in by the front end 154b of the link member 154. When the operator releases hold of the handle 166 of the lever 152 in this state, the link member 154 is pushed back by the plunger 198, and consequently, the lever 152 is returned to the first pivoting position automatically. In addition, the displacement blocking member 138 has a rubber protecting member 199 attached to the front end thereof to reduce impact on the female coupling member 130 when dropped or hit against the male coupling member 110 undesirably.

As shown in FIG. 6B, the female coupling member 130 has a valve member 184 disposed in a female-side passage 132 thereof. The valve member 184 is formed as a one-piece member integrated throughout from a valve seat portion 184a to a proximal portion 184b, thereby making it possible to enlarge a flow path opening 184d. In addition, a female-side slide valve element 186 is configured to slide in direct contact with the inner peripheral surface 134a of the female coupling body 134, thereby eliminating the sliding member 88, which is provided in the first form. Sealing engagement between the valve seat portion 184a and the female-side slide valve element 186 is made by a seal ring 185 attached to the valve seat portion 184a. Because the sliding member 88 is eliminated, the area between the female-side slide valve element 186 and the inner peripheral surface 134a of the female coupling body 134 is not sealed, and leaking internal fluid or the like may enter through the gap and collect in the space between the inner peripheral surface 134a and a bellows 190. Therefore, as shown in FIG. 6A, the female coupling body 134 is provided with washing holes 200 at upper and lower positions thereof so that the washing holes 200 extend through the female coupling body 134 to the female-side passage 132 to communicate with the space in the female-side passage 132 between the inner peripheral surface 134a and the bellows 190. From one of the washing holes 200, a fluid such as nitrogen gas or water is injected and discharged from the other washing hole 200, thereby enabling washing off of the internal liquid or the like collected between the inner peripheral surface 134a and the bellows 190 in the female-side passage 132. It should be noted that the washing holes 200 are usually closed with stoppers to inhibit entry of foreign substances through the washing holes 200.

In the pipe coupling 101 according to the second form, the male coupling member 110 and the female coupling member 130 are connected and disconnected by operations similar to those of the pipe coupling 1 according to the first form.

Although a female coupling member having a chuck member operated by a lever has been explained above as one form of the coupling member according to the present disclosure, the coupling member of the present disclosure is not limited thereto. For example, the movable member is not limited to chuck members such as those in the foregoing forms but may be other movable members such as a valve that is connected to a lever directly or indirectly through a link member or the like to open and close a passage through which a fluid passes. The lock member may be provided on the coupling body instead of on the lever.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

The description of the disclosure is merely exemplary in nature and, thus, variations that do not depart from the substance of the disclosure are intended to be within the scope of the disclosure. Such variations are not to be regarded as a departure from the spirit and scope of the disclosure.

As used herein, the phrase at least one of A, B, and C should be construed to mean a logical (A OR B OR C), using a non-exclusive logical OR, and should not be construed to mean "at least one of A, at least one of B, and at least one of C.

What is claimed is:

1. A coupling member comprising:
a cylindrical coupling body having a fluid passage;
a movable member mounted displaceably relative to the cylindrical coupling body between a first position and a second position;
a lever pivotable relative to the cylindrical coupling body between a first pivoting position where the lever places the movable member in the first position and a second pivoting position where the lever places the movable member in the second position;
a lever holding member secured to the cylindrical coupling body, the lever holding member engaging the lever when the lever is in the second pivoting position to inhibit the lever from pivoting toward the first pivoting position; and
a link member having a first end pivotably connected to the lever at a position away from a pivot center of the lever and a second end pivotably connected to the movable member, the movable member being configured to be displaced in a direction of a longitudinal axis of the cylindrical coupling body when the lever is pivoted,
wherein when the lever is displaced from the first pivoting position to the second pivoting position, a pivot axis of the link member relative to the lever moves from one side to another side across a plane passing through the pivot center of the lever and a pivot axis of the link member relative to the movable member.

2. The coupling member of claim 1, wherein the lever has a lever body pivotable relative to the cylindrical coupling body, and a lock member displaceably attached to the lever body, the lock member being displaceable between a holding position and a releasing position, wherein in the holding position, the lock member engages the lever holding member when the lever is in the second pivoting position to hold the lever in the second pivoting position, and in the releasing position, the lock member is displaced away from the lever holding member to disengage from the lever holding member.

3. The coupling member of claim 2, wherein the lever further has a spring urging the lock member toward the holding position.

4. The coupling member of claim 3, wherein a direction of displacement of the lock member between the holding position and the releasing position is offset from a radial direction from a pivot center of the lever body, so that force applied to the lever body through the spring when the lock member is displaced from the holding position to the releasing position produces a turning moment which causes the lever to pivot in a direction away from the first pivoting position.

5. The coupling member of claim 2, wherein the lever holding member has a sliding engagement surface with which the lock member slidingly engages to hold the lock member in the releasing position when the lever pivots between the first pivoting position and the second pivoting position.

6. A coupling member comprising:
   a cylindrical coupling body having a fluid passage;
   a movable member mounted displaceably relative to the cylindrical coupling body between a first position and a second position;
   a lever pivotable relative to the cylindrical coupling body between a first pivoting position where the lever places the movable member in the first position and a second pivoting position where the lever places the movable member in the second position; and
   a lever holding member secured to the cylindrical coupling body, the lever holding member engaging the lever when the lever is in the second pivoting position to inhibit the lever from pivoting toward the first pivoting position, wherein
   the movable member is a chuck member disposed radially outside of the cylindrical coupling body to lock an associated coupling member,
   the chuck member being displaceable in a longitudinal direction along a longitudinal axis of the cylindrical coupling body between a temporarily connecting position which is the first position and a connecting position which is the second position, the chuck member being also radially displaceable between a locking position where the chuck member locks the associated coupling member and an unlocking position where the chuck member is displaced radially outward from the locking position to unlock the associated coupling member,
   wherein when the lever is pivoted from the first pivoting position to the second pivoting position in a state where the chuck member has locked the associated coupling member in the temporarily connecting position, the chuck member is displaced from the temporarily connecting position to the connecting position to draw the associated coupling member into the fluid passage, thereby connecting the associated coupling member to the coupling member.

* * * * *